Aug. 15, 1939   L. E. BROUGHTON   2,169,460
SOCKET HEAD SCREW AND METHOD OF MAKING THE SAME
Filed Dec. 21, 1938
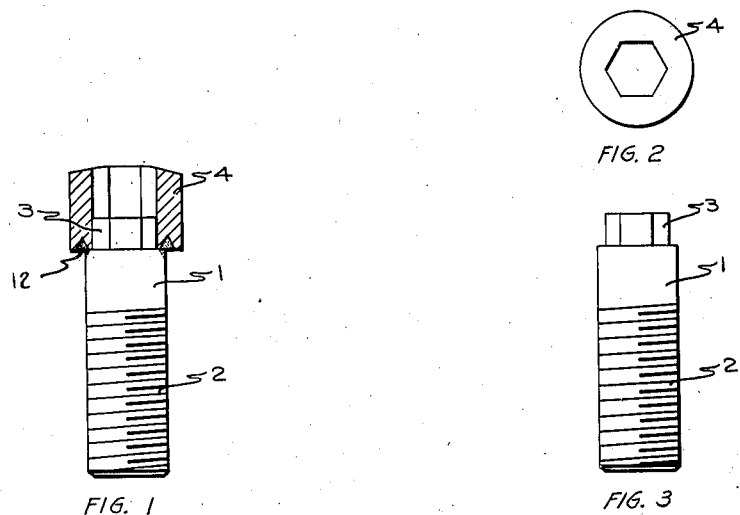
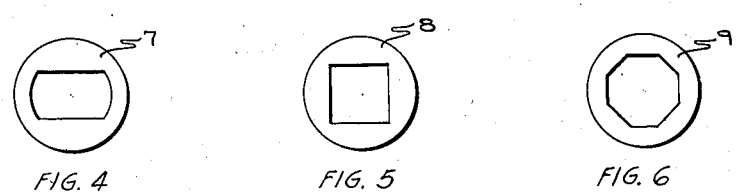
Inventor
LYLE E. BROUGHTON
By Beaman & Langford
Attorneys Patented Aug. 15, 1939

2,169,460

UNITED STATES PATENT OFFICE 2,169,460

SOCKET HEAD SCREW AND METHOD OF MAKING THE SAME

Lyle E. Broughton, Jackson, Mich.

Application December 21, 1938, Serial No. 246,938

4 Claims. (Cl. 10—10)

This invention relates to screws and particularly to a socket head screw and the method of making the same.

In the past, socket head screws have usually been made by methods including expensive swaging operations. It has been determined that socket head screws can be made considerably more cheaply by making the head and the shank portions separately and welding them together.

An object of the invention, therefore, is to provide a socket head screw having a shank and a head portion with a welded connection therebetween.

Another object of the invention is to provide a method of making socket head screws, which comprises making the head and the shank portions separately and welding the two together.

A further object of the invention is to provide a method of making socket head screws, which comprises making a tubular head having an opening therethrough of predetermined cross-section, making a shank having an end portion of the same cross-section as said head, fitting the two together and welding the two together.

These and other objects will be apparent from the following specification when taken with the accompanying drawing, in which Fig. 1 is a vertical section disclosing the invention, Fig. 2 is an end elevation of the socket head before attachment to the shank, Fig. 3 is a side elevation of the shank ready to receive the socket head, and Figs. 4, 5, 6, 7 and 8 are end elevations of various forms that the socket head might take.

Referring particularly to the drawing, the reference character 1 indicates the shank of a cap screw having a threaded portion 2. While the invention is described as particularly relating to cap screws, it will be understood that it may be applied to any type of screw or bolt and that the term "screw" in the specification includes screws, bolts and the like. The shank 1 preferably is fabricated from round bar stock and may be made, with the exception of the head portion 3, in an automatic screw machine or in any manner desired. The head portion 3 is non-circular and, as disclosed in Figs. 1 and 2, is hexagonal in cross-section. This head portion 3 preferably is made by milling.

The socket screw head 4 is of tubular form and preferably has a circular exterior. The cross-section of the opening therethrough is non-circular and of the same cross-section as that of the head portion 3 of the shank 1. While the cross-sections of the head portion 3 of the shank 1 and of the opening through the head portion 4 are disclosed in Figs. 1, 2 and 3 as hexagonal, it will be understood that these cross-sections may take any other non-circular configuration as desired. In Figs. 4, 5, 6, 7 and 8 are illustrated socket heads 7, 8, 9, 10 and 11, respectively, having the openings therethrough of different suggested cross-sections. While it is preferred that the openings through the socket heads be formed by punching directly to give the internal cross-sectional configuration desired, it will be understood that other methods of forming the openings therethrough may be employed, such as by punching or drilling a cylindrical opening, and broaching it to the desired cross-sectional configuration.

After the shank 1 and the head 4 have been completed and are in the form disclosed in Figs. 2 and 3, the head portion 3 of the shank 1 is telescopically fitted into one end of the socket head 4. Since these have the same cross-sections, a snug fit is obtained. The head 4 and the shank 1 are then welded together in some suitable manner, although it is considered that atomic welding is very satisfactory. The welded connection 12 shown in the drawing is merely by way of illustrating that the joint is welded and is not to be taken as illustrative of any specific type of weld.

It will be apparent from the foregoing specification that I have provided a socket head screw and a method of making the same which is entirely as satisfactory as one having an integral head and shank. The method, however, may be carried out with a less expenditure of time and with the use of less expensive equipment than has been necessary heretofore in the production of socket head screws.

Having thus described my invention, what I desire to secure by Letters Patent and claim is:

1. The method of making socket head screws, which comprises separately forming a cylindrical head and a threaded shank, punching an axially extending bore through said head of non-circular cross-section, forming the upper end of said shank to the size and cross-section of said bore, partially telescoping said upper end into said bore so as to provide a socket in said head above said upper end, and then integrally uniting said shank to said head.

2. A socket head screw having a separately formed head of cylindrical shape with a non-circular central bore of uniform cross-section extending entirely through the head, a separately formed threaded shank having a plain upper end portion of substantially the same external cross-section as said bore, said upper end extending into and partially through said bore to define a socket opening through the top of said head and above said upper end, and an integral connection between said head and shank.

3. A socket head screw having a separately formed head of cylindrical shape with a non-circular bore of uniform cross-section extending entirely through the head, a shank having a threaded portion of uniform diameter, the upper end of said shank for a distance less than the length of said bore being of less diameter than said threaded portion and conforming to the cross-section of said bore, said upper end portion extending into and partially through said bore to define a socket opening through the top of said head and above said upper end, a shoulder upon said shank abutting the bottom of said head and defined between said portions of different diameter, and an integral connection between said shoulder and said head.

4. A socket head screw, having a separately formed head of cylindrical shape with a center bore extending entirely through the head, at least a substantial portion of said bore inwardly from the top of said head being of non-circular cross-section, a separately formed threaded shank having an upper end portion of substantially the same external cross-section as that of at least a substantial portion of said bore inwardly from the lower portion of said head, the upper end of said shank extending into and partially through said bore to define a socket opening through the top of said head and above said upper end, and an integral connection between said head and shank.

LYLE E. BROUGHTON.